Figure 1:
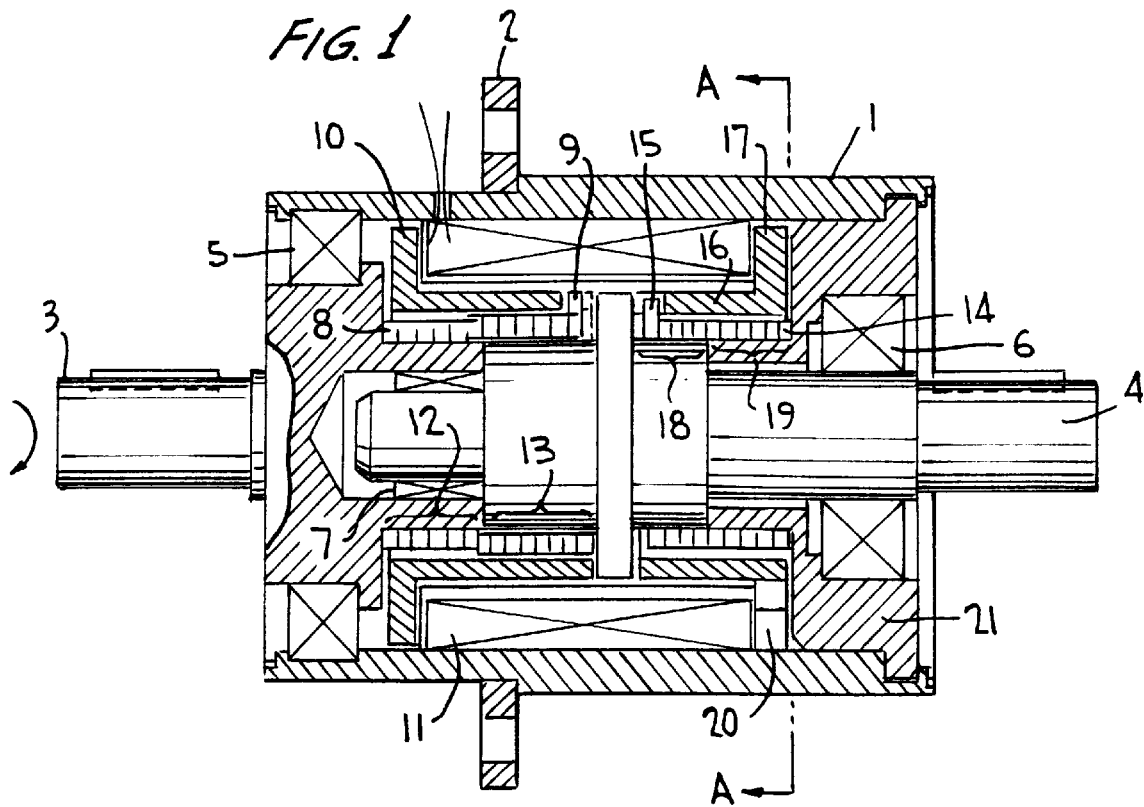

United States Patent
Iten

[11] Patent Number: 6,164,426
[45] Date of Patent: Dec. 26, 2000

[54] WRAP AROUND SPRING CLUTCH

[75] Inventor: Peter Iten, Stafa, Switzerland

[73] Assignee: Baumann Federn AG, Ruti, Switzerland

[21] Appl. No.: 09/375,371

[22] Filed: Aug. 17, 1999

[30] Foreign Application Priority Data

Sep. 25, 1998 [CH] Switzerland ............... 1956/98

[51] Int. Cl.[7] .................................................. F16D 67/06
[52] U.S. Cl. ........................ 192/15; 192/17 C; 192/17 D
[58] Field of Search ................... 192/15, 17 C, 192/17 D, 12 BA, 12 D, 84.81

[56] References Cited

U.S. PATENT DOCUMENTS

| | | | |
|---|---|---|---|
| 2,951,568 | 9/1960 | Hungerford et al. | 192/12 BA |
| 2,976,976 | 3/1961 | Parker | 192/12 BA X |
| 3,185,276 | 5/1965 | Sajovec | 192/84.81 |
| 3,349,880 | 10/1967 | Baer | 192/12 BA X |
| 3,905,458 | 9/1975 | Mehrbrodt | 192/84.81 X |
| 3,966,024 | 6/1976 | Baer | 192/12 BA X |
| 4,321,992 | 3/1982 | Gallo | 192/84.81 X |
| 4,817,771 | 4/1989 | Iten | 192/17 D X |
| 5,090,530 | 2/1992 | Leone | 192/12 BA |
| 5,099,974 | 3/1992 | Spechko | 192/84.81 |

*Primary Examiner*—Rodney H Bonck
*Attorney, Agent, or Firm*—Breiner & Breiner

[57] ABSTRACT

At the electromagnetically controlled wrap around spring clutch a braking spring (14) designed as a wrap around spring is foreseen on the driven shaft (4) in addition to the clutch spring (8) acting between the driving shaft (3) and the driven shaft (4), which braking spring (14) is also switched by the control magnet (11), such that if the magnet is excited the driven shaft (4) is released, but at a currentless magnet the driven shaft (4) is immediately braked and blocked in the direction of the drive.

1 Claim, 1 Drawing Sheet

WRAP AROUND SPRING CLUTCH

The present invention relates to a electromagnetically switched wrap around spring clutch between a driving and a driven shaft, with a wrap around spring which forms a clutch spring and rests with a first section with a friction contact on the driving shaft while a second section envelopes the coaxial arranged driven shaft, and with a control magnet which upon being excited causes the wrap around spring to enter into a friction contact with the driven shaft and at a non-excitation releases this friction contact again.

Electromagnetically switched wrap around spring clutches are known. Such solutions are disclosed among others in the patent specifications U.S. Pat. No. 5,031,744, U.S. Pat. No. 5,127,502, U.S. Pat. No. 5,099,974, U.S. Pat. No. 4,321,992. All these solutions have in common that the driven side is free in both directions of rotation when the coil is not excited (That is current-less).

There are, however, applications of drives in which the driven side shall be braked, i.e. when the coupling is released the load should be braked as fast as possible without the driven side rotating further due to the existing inertia of the mass and idling to a stop within a longer or shorter time span depending from the frictional resistance.

Object of the present invention is to provide a wrap around spring clutch which fulfils above requirement.

The invention described hereinafter solves this object in such a manner that the load after the disengaging is braked within a shortest time span, but that the driven side if necessary can be rotated back in a sense of rotation contrary to the driving sense of rotation of the braked or disengaged state.

Especially advantageous embodiments are defined in the dependent claims.

Figure 2:
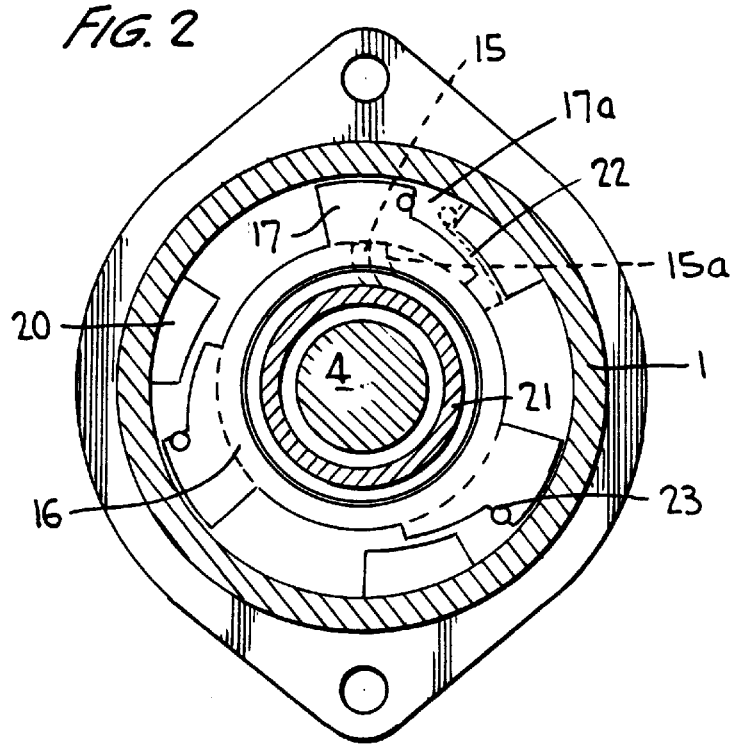

The invention will be explained in the following somewhat more in detail with reference to an embodiment illustrated in the drawing, wherein:

FIG. 1 illustrates a longitudinal section through a wrap around spring clutch according to the invention, and FIG. 2 is a cross-section along line A—A of FIG. 1

The clutch consists of a housing 1 which is mounted via the flange 2 in a structural arrangement. The shaft 3 acts as drive, which shaft 3 is supported on the one hand in the housing 1 by a roller bearing 5 and is supported on the driven shaft 4 in the bearing 7. The driven shaft 4 is supported in the housing 1 via the bearing 6 and the flange 21. The flange 21 is pressed into the housing 1 and is secured against a rotational movement.

In the illustrated embodiment of FIG. 1 the direction of the rotation as seen at the driving shaft is towards the right (Clockwise). FIG. 1 depicts additionally the currentless state of the coil 11.

The one wrap around spring 8 acts as clutch spring. It is mounted prestressed on the driving shaft 3, i.e. in the area 12, the non-tensioned inner diameter of the clutch spring is smaller than the corresponding diameter of the shaft. In the area 13 of the driving shaft 4 the non-tensioned inner diameter of the clutch spring is larger than the diameter of the shaft. Accordingly, a complete separation between the drive side and the driven side is ensured.

The braking spring 14 features a non-tensioned inner diameter which is smaller than the two shaft diameters 18 and 19 of the driving shaft 4 and of the flange 14. The braking spring is, additionally designed in such a manner that it blocks or brakes, resp. the driven shaft 4 in the direction of rotation of the driving side, in this illustration clockwise.

The clutch engaging operation can proceed only if the driving shaft rotates. The rotating clutch spring 8 is, thereby, also rotated and also the sleeve 10 because it is hooked in at the outwards bent end 9 of the spring. When the coil 11 gets excited, the sleeve 10 is braked until the air gap between clutch spring and driven shaft 4 is closed at the area 13. When this is the case, a friction contact between clutch spring 8 and driven shaft 4 occurs.

An engaging of the clutch is, however, only then possible, when at the same time as the coil 11 is excited the braking spring 14 is opened or lifted, resp., too, and the end 15 of the spring has been brought into the position 15a. For this only 5 to 10° opening angle is needed. This movement is arrived at in that an anchor body 20 is mounted to the front end of the coil into which a number (e.g. three) segments 17 of the sleeve 16 engage. The excitation of the coil causes now a braking force between the front surfaces of the segments 17 and of the anchor body 20 which rotates the sleeve 16 by the necessary angle of 5 to 10° because the end 15 of the braking spring 14 is hooked in this sleeve 16 in a form locked manner, therefore annuls the action of the braking spring 14, and the clutch spring 8 transmits the rotational movement onto the driven shaft 4.

A small air gap 22 must be set between the two surfaces of segment 17 and anchor body 20 such that no metallic contact between these two parts can take place. The limiting of this position is accomplished by the attenuating element 23 placed into the segment 17 which by a suitable selection of the material prevents a metallic contact and at the same time acts in a dampening manner.

If the excitation of the coil is switched off, the clutch spring 8 opens and disengages. At the same instance the sleeve 16 rotates on its own by the braking spring 14, because it has been tensioned in the manner of a torsion spring, back into the position, brakes the driven shaft 4 and arrests thereafter the driven shaft 4 again in the driving direction. In the opposite direction of rotation the driven shaft 4 may, however, be rotated because the braking spring 14 can block only one direction of rotation.

What is claimed is:

1. Wrap around spring clutch between a driving shaft and a driven shaft, comprising a driving shaft and a driven shaft with a wrap around spring which forms a clutch spring which rests by a first section at a friction contact on the driving shaft while a second section envelopes coaxially the driven shaft, and with a control magnet, which upon being excited causes the wrap around spring to enter into a friction contact with the driven shaft and at non-excitation releases the friction contact with the driven shaft, wherein said driven shaft is additionally enveloped by a braking spring which in case of a non-excited control magnet blocks the driven shaft in a direction of drive of the driven shaft, which blocking is released when the control magnet is excited, said braking spring enveloping the driven shaft with a first section and rests with a second section blocked against rotation on a stationary flange which envelopes the driven shaft, and means for rotating the first section of the braking spring in a direction opposite of action of the braking spring and thus opens the braking spring over the driven shaft when the control magnet is excited, said means for rotating comprising a rotatable sleeve in which said first section of the braking spring is anchored, and said sleeve comprising projecting segments which engage an anchor body on a front side of the control magnet and cooperates with the anchor body such that upon excitation of the control magnet the sleeve is rotated by a predetermined opening angle in order to disengage the braking spring from the driven shaft, whereby upon a discontinuation of excitation of the magnet, the braking spring returns on its own to a state of blocking the driven shaft.

* * * * *